(12) United States Patent
Kitamura et al.

(10) Patent No.: US 7,144,027 B2
(45) Date of Patent: Dec. 5, 2006

(54) BICYCLE CONTROL APPARATUS THAT SETS A BICYCLE TRANSMISSION TO A PREDETERMINED GEAR RATIO

(75) Inventors: Satoshi Kitamura, Kitakatsuragi-gun (JP); Kazuhiro Takeda, Sakai (JP)

(73) Assignee: Shimano, Inc., Sakai (JP)

( * ) Notice: Subject to any disclaimer, the term of this patent is extended or adjusted under 35 U.S.C. 154(b) by 56 days.

(21) Appl. No.: 10/904,092

(22) Filed: Oct. 22, 2004

(65) Prior Publication Data

US 2005/0098978 A1   May 12, 2005

(30) Foreign Application Priority Data

Oct. 28, 2003  (JP) .............................. 2003-366921

(51) Int. Cl.
*B62M 1/02* (2006.01)
*F16H 63/00* (2006.01)

(52) U.S. Cl. ........................ 280/260; 280/259; 474/69; 474/70; 474/78; 474/80

(58) Field of Classification Search ................ 280/259, 280/260; 474/69, 70, 78, 80
See application file for complete search history.

(56) References Cited

U.S. PATENT DOCUMENTS 5,261,858 A * 11/1993 Browning .................... 474/69

| | | | |
|---|---|---|---|
| 6,047,230 A * | 4/2000 | Spencer et al. | ................. 701/57 |
| 6,454,288 B1 * | 9/2002 | Horiuchi | ...................... 280/260 |
| 6,866,279 B1 * | 3/2005 | Fujii | ........................... 280/260 |
| 6,877,755 B1 * | 4/2005 | Takamoto | ................... 280/260 |
| 2005/0255950 A1 * | 11/2005 | Takebayashi et al. | ......... 474/70 |

FOREIGN PATENT DOCUMENTS

| | | |
|---|---|---|
| JP | 10-181671 A | 7/1998 |
| JP | 11-291971 A | 10/1999 |
| JP | 2000-038187 A | 2/2000 |
| JP | 2000-266177 A | 9/2000 |
| JP | 2000-283283 A | 10/2000 |
| JP | 2002-187584 A | 7/2002 |

* cited by examiner

*Primary Examiner*—Lesley D. Morris
*Assistant Examiner*—Marc A. Scharich
(74) *Attorney, Agent, or Firm*—James A. Deland (57) ABSTRACT

A control apparatus for an electrically operated bicycle transmission comprises a power supply sensor and a control unit operatively coupled to the power supply sensor. The power supply sensor senses a power characteristic of a power supply, and the control unit provides a signal to operate the bicycle transmission when the power characteristic falls below a predetermined value. Alternatively, the control apparatus comprises a running condition time sensor and a control unit operatively coupled to the running condition time sensor. The running condition time sensor senses a time interval of a running condition of a bicycle, and the control unit provides a signal to operate the bicycle transmission to a predetermined gear ratio when the time interval of the running condition passes a selected value.

10 Claims, 12 Drawing Sheets

| | GEAR SPEED | UPSHIFT THRESHOLD VALUE (U) (km/h) | DOWNSHIFT THRESHOLD VALUE (D) (km/h) |
|---|---|---|---|
| MODE A1 | 1 | 13 | 0 |
| | 2 | 16 | 12 |
| | 3 | 19 | 14 |
| | 4 | 255 | 17 |
| MODE A2 | 1 | 11 | 0 |
| | 2 | 14 | 10 |
| | 3 | 17 | 12 |
| | 4 | 255 | 15 |

|  | GEAR SPEED | UPSHIFT THRESHOLD VALUE (U) (rpm) | DOWNSHIFT THRESHOLD VALUE (D) (rpm) |
|---|---|---|---|
| MODE A1 | 1 | 75 | 0 |
|  | 2 | 75 | 55 |
|  | 3 | 75 | 55 |
|  | 4 | 255 | 55 |
| MODE A2 | 1 | 70 | 0 |
|  | 2 | 70 | 50 |
|  | 3 | 70 | 50 |
|  | 4 | 255 | 50 |

BICYCLE CONTROL APPARATUS THAT SETS A BICYCLE TRANSMISSION TO A PREDETERMINED GEAR RATIO

BACKGROUND OF THE INVENTION

The present invention is directed to bicycles and, more particularly, to a bicycle control apparatus that sets a bicycle transmission to a predetermined or desired gear ratio in response to certain conditions.

Bicycles often are equipped with transmissions that provide a plurality of gear ratios to facilitate riding over various terrain. Such transmissions typically comprise either internal or external transmissions. Internal transmissions usually comprise a planetary gear mechanism disposed within the rear wheel hub. External transmissions typically comprise a plurality of sprockets that rotate coaxially with the rear wheel, and a derailleur that switches the drive chain among the plurality of sprockets. In either case, the transmission usually is connected to a shift control lever mounted to the handlebar or to some other convenient location. The rider then may select a desired gear ratio by manually manipulating the shift control lever.

In many instances, the shift control lever is positioned close to the brake lever, and it is sometimes necessary to simultaneously operate the brake lever and the shift lever when decelerating. This makes the shift operation difficult to perform. Electrically powered bicycle transmissions have been developed, and such systems avoid the problems that occur when the shift control lever is positioned close to the brake lever. Systems such as that disclosed in Japanese Published Patent Application No. 2003-011879 use an electrically powered operating unit, such as a motor or solenoid, to operate the bicycle transmission. The operating unit may directly operate the bicycle transmission, or the operating unit may indirectly operate the bicycle transmission via a shift cable. A shift control device that operates in either an automatic or a manual mode controls the operating unit. In manual mode, signals from a manually operated device are used to control the operating unit. In automatic mode, signals for controlling the operating unit are generated automatically based on a riding condition of the bicycle (such as bicycle velocity or crank rotation speed).

Both the operating unit and the shift control device operate using electric power supplied by a power supply. Unfortunately, when the voltage of the power supply has dropped to the point that the operating unit no longer operates reliably, as may occur with frequent shift operations, the system is unable to shift the bicycle transmission, which results in great discomfort to the rider. For example, if shifting is no longer possible while the bicycle transmission is in a low gear, then the rider must pedal at a high rate in order to maintain normal velocity. On the other hand, if shifting is no longer possible while the bicycle transmission is in a high gear, then great pedaling force is required in order to maintain normal velocity.

SUMMARY OF THE INVENTION

The present invention is directed to various features of a bicycle control device. In one embodiment, a control apparatus for an electrically operated bicycle transmission comprises a power supply sensor and a control unit operatively coupled to the power supply sensor. The power supply sensor senses a power characteristic of a power supply, and the control unit provides a signal to operate the bicycle transmission when the power characteristic falls below a predetermined value. In another embodiment, the control apparatus comprises a running condition time sensor and a control unit operatively coupled to the running condition time sensor. The running condition time sensor senses a time interval of a running condition of a bicycle, and the control unit provides a signal to operate the bicycle transmission to a predetermined gear ratio when the time interval of the running condition passes a selected value. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
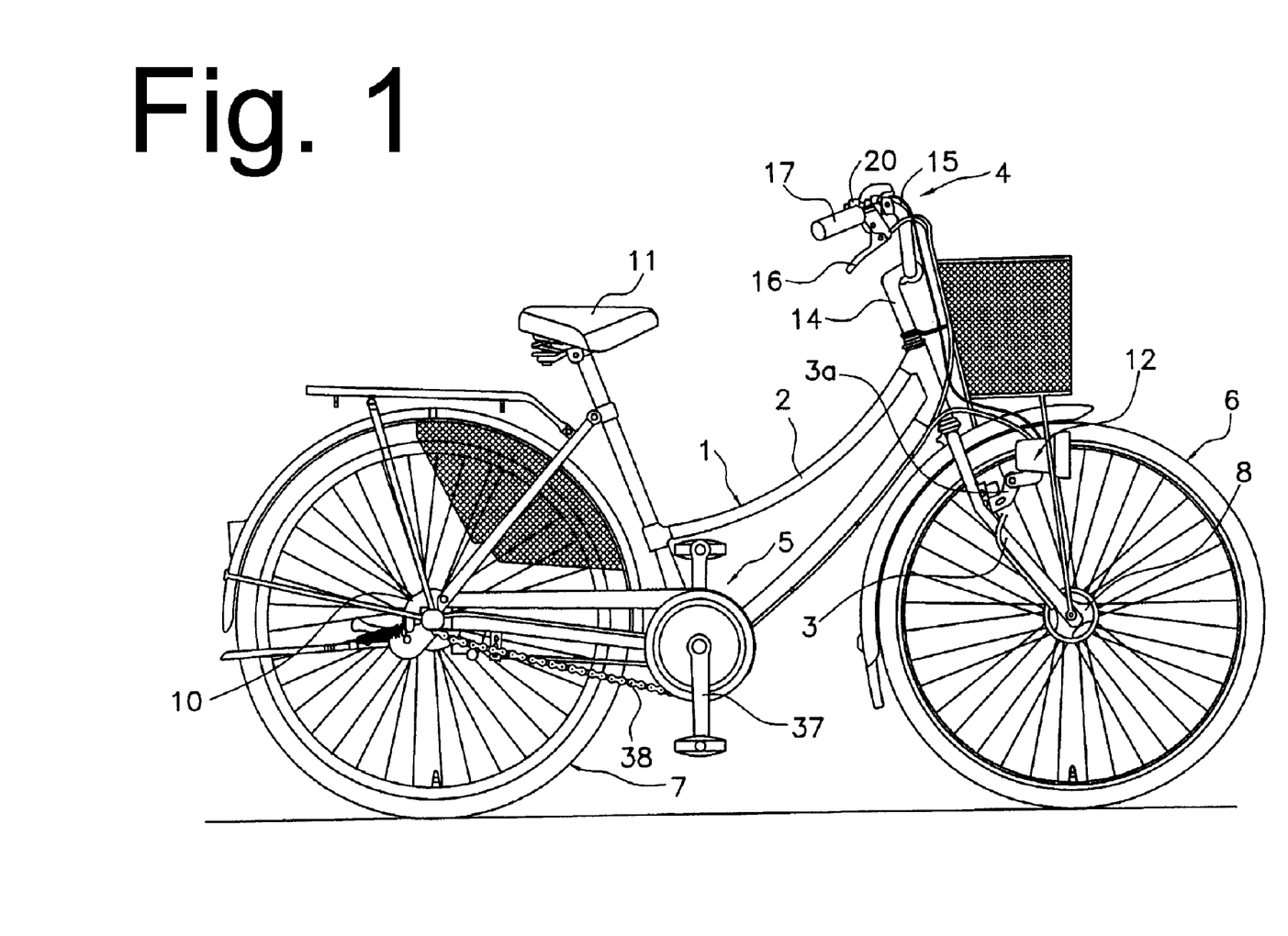
FIG. 1 is a side view of a particular embodiment of a bicycle.

FIG. 1 is a side view of a particular embodiment of a bicycle 1. Bicycle 1 is a light roadster recreational bicycle comprising a double-loop frame body 2 formed from welded tubes, a front fork 3 mounted to the frame body 2 for rotation around an inclined axis, a handlebar assembly 4, a drive component 5, a front wheel 6 on which an alternating current generating dynamo hub 8 with brakes is mounted, a rear wheel 7 on which a bicycle transmission such as an internal shifting hub 10 is mounted, a saddle 11, a shift control unit 12 to control shifting of the internal shifting hub 10, and a shift controller 20 for operating the shift control unit 12.

Figure 3:
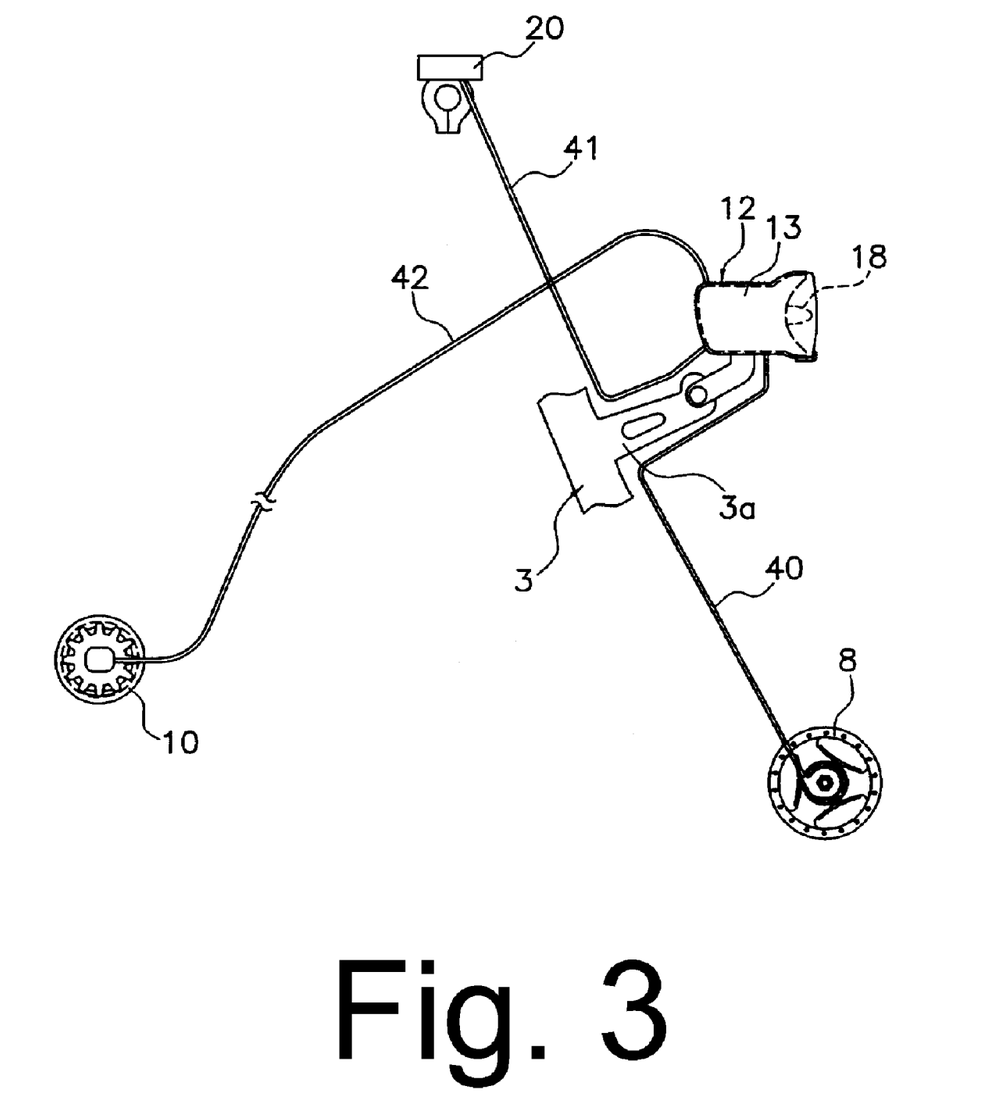
FIG. 3 illustrates how a shift controller, a shift control unit, an alternating current generator and a hub transmission are coupled together.

The handlebar assembly 4 comprises a handle stem 14, fastened to the upper part of the front fork 3, and a handlebar 15 fastened to handle stem 14. Brake levers 16 and grips 17 are mounted on both ends of handlebar 15. In this embodiment, shift controller 20 is integrated with the right-side brake lever 16. Drive component 5 comprises a crank 37, mounted on the lower part (bottom bracket component) of the frame body 2, and a chain 38 that engages crank 37 and internal shifting hub 10. Internal shifting hub 10 is capable of producing four gear ratios (gears). These four gear ratios can be selected by means of a motor unit 29 (FIG. 4) in shift control unit 12. The dynamo hub 8 of front wheel 6 can be fitted with a roller-type front brake, and it houses an alternating current generating dynamo (D) 19 (FIG. 6) that generates electricity in response to the rotation of front wheel 6. As shown in FIG. 3, shift control unit 12 is electrically connected to the alternating current generating dynamo 19 housed in dynamo hub 8 by electrical wiring 40, and it is electrically connected to shift controller 20 by electrical wiring 41. Shift control unit 12 is mechanically connected to internal shifting hub 10 by a shift control cable 42.

Figure 4:
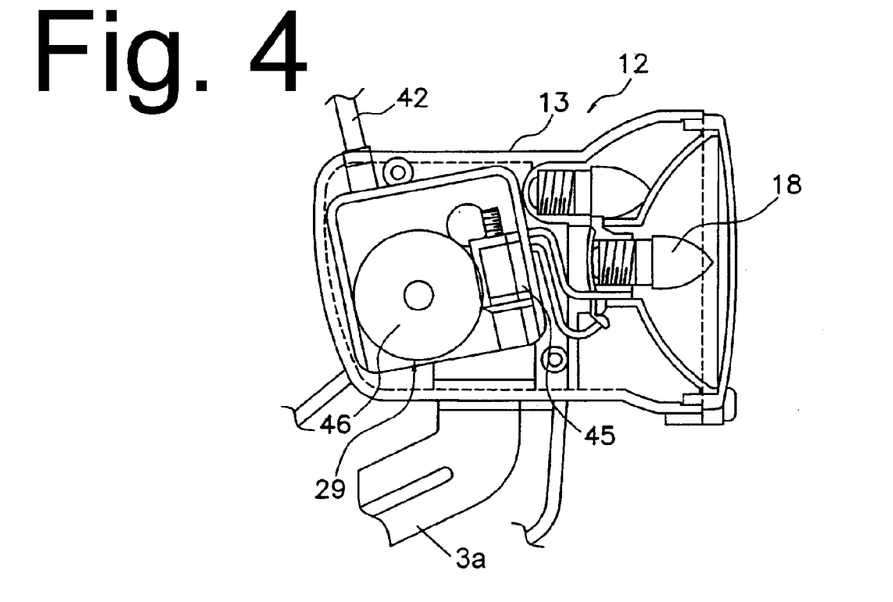
FIG. 4 is a side cross sectional view of the shift control unit shown in FIG. 3.
Figure 5:
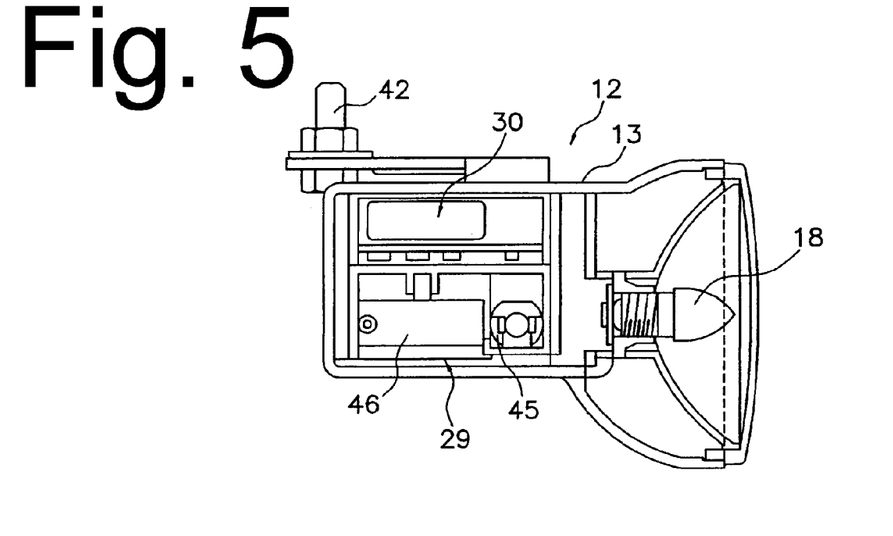
FIG. 5 is a top cross sectional view of the shift control unit shown in FIG. 3.

As shown in FIGS. 4 and 5, shift control unit 12 comprises a headlight case 13 mounted to a headlight stay 3a located midway along the front fork 3 for housing a lamp 18. Motor unit 29 and a circuit unit 30 are housed in headlight case 13. Motor unit 29 comprises an electric shifting motor 45, a cable operating component 46 which moves into four shifting positions by means of shifting motor 45, and an operating position sensor 47 (FIG. 6) to detect the shift position of cable operating component 46. One end of shift control cable 42 is connected to cable operating component 46. Circuit unit 30 comprises a control unit 25 (FIG. 6) containing a microcomputer comprising a CPU, RAM, ROM, an I/O interface, etc.

Figure 2:
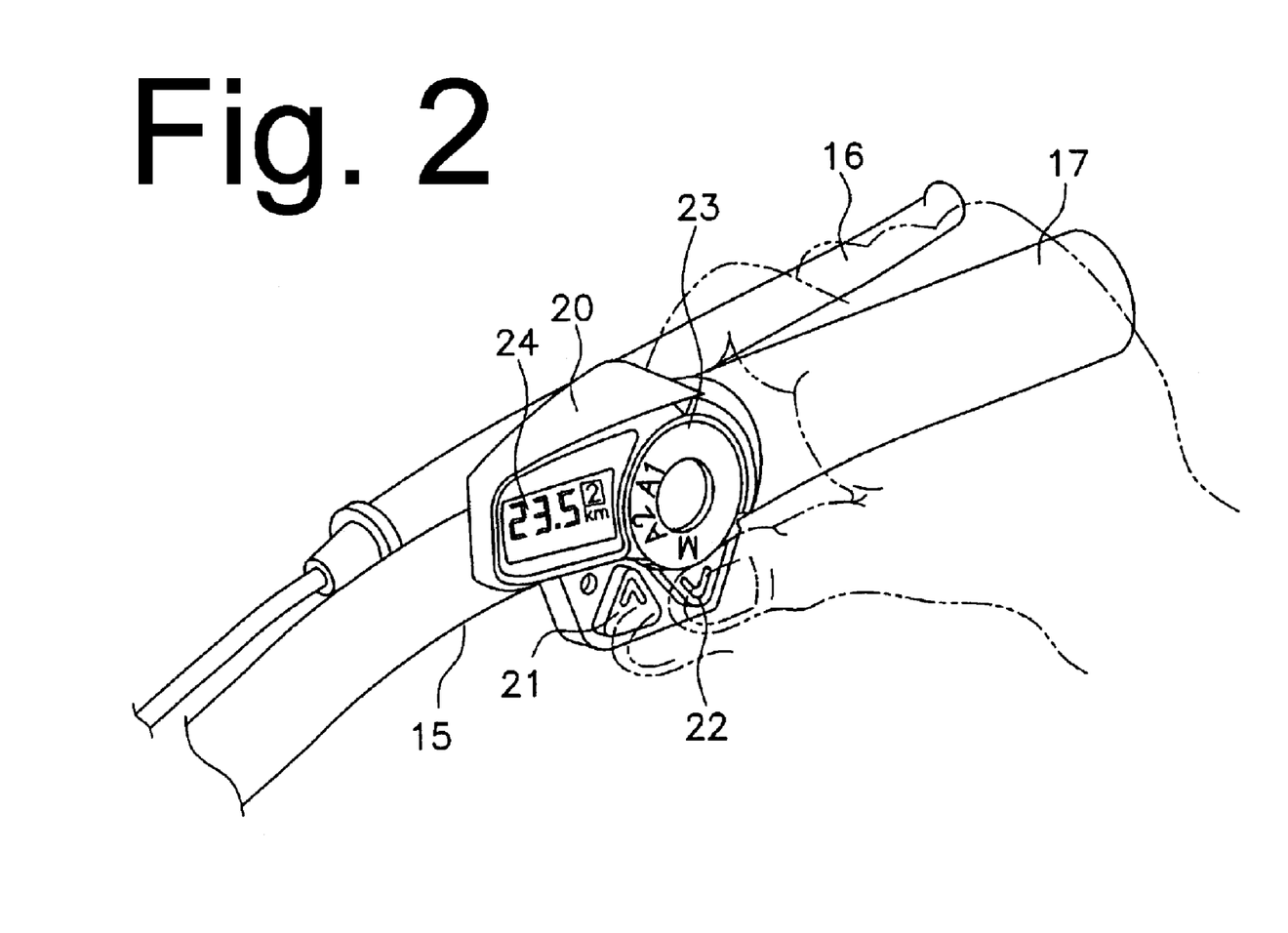
FIG. 2 is a closer view of a particular embodiment of a handlebar mounted shift controller.
Figure 7:
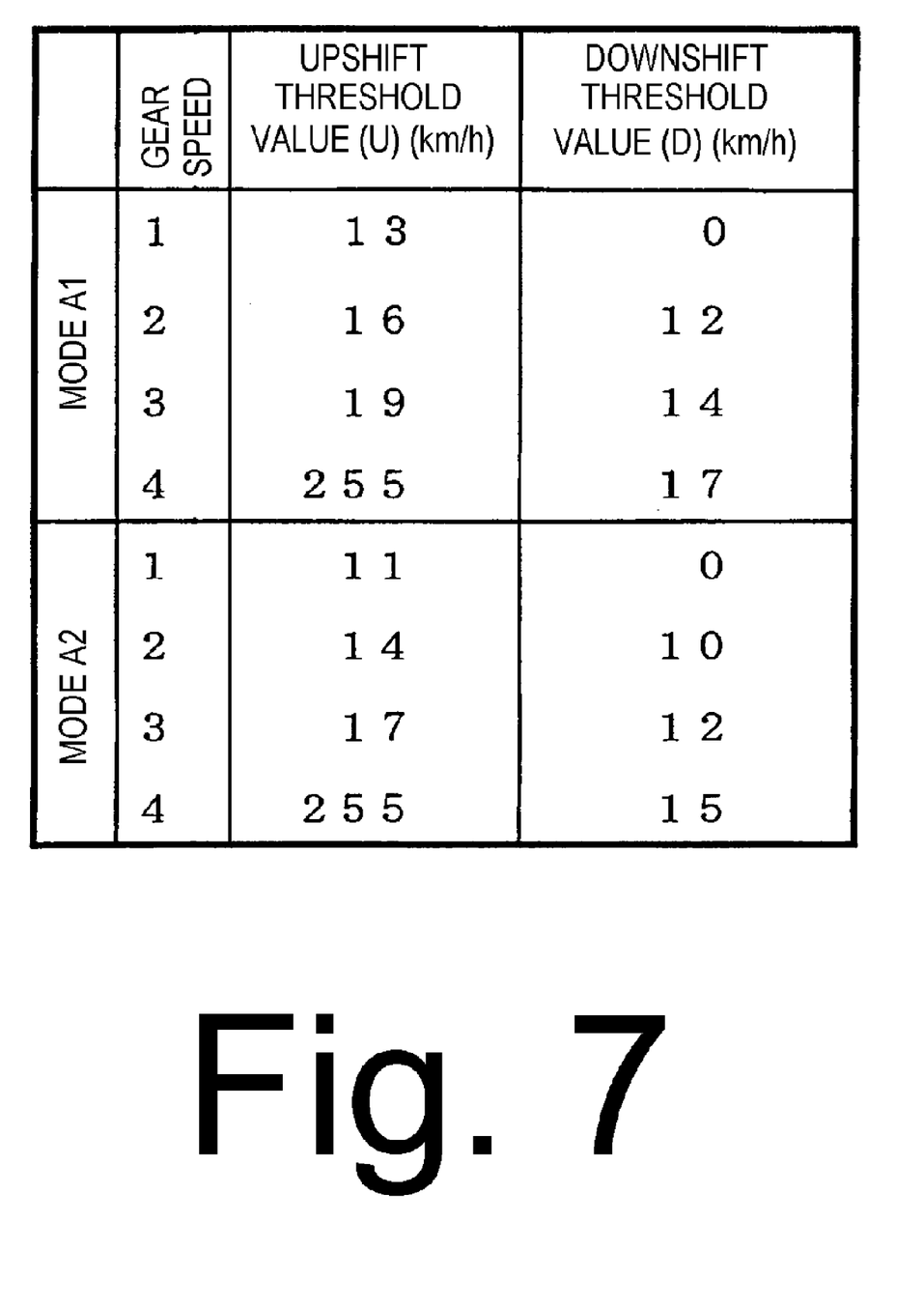
FIG. 7 is a table illustrating a particular embodiment of shift threshold values.

As shown in FIG. 2, shift controller 20 comprises two operating buttons 21 and 22 in the form of triangular pushbuttons disposed next to each other, an operating dial 23 disposed above operating buttons 21 and 22, and a liquid crystal display device 24 disposed to the left of operating dial 23 for displaying information such as current gear and speed. The operating button 21 on the left side may be used for manually shifting progressively from a lower gear ratio to a higher gear ratio. The operating button 22 on the right side may be used for manually shifting progressively from a higher gear ratio to a lower gear ratio. The operating dial 23 is used for switching between two automatic shifting modes (A1 and A2) and a manual shifting mode (M) using three detent positions. The two automatic shifting modes (A1 and A2) are modes for automatically shifting internal shifting hub 10 according to a bicycle speed signal derived from alternating current generating dynamo 19. The two automatic shifting modes (A1 and A2) are designed to allow shift timing (i.e., the threshold speed values at which shifting will occur) to be automatically changed during upshifting (shifting from the lower gear ratio speed to the higher gear ratio) or downshifting (shifting from the higher gear ratio to the lower gear ratio) to accommodate rider preference and physical capability. FIG. 7 is a table illustrating a particular embodiment of upshift and downshift threshold values that may be used to control automatic shifting depending on bicycle speed in the two automatic shifting modes (A1) and (A2).

Figure 6:
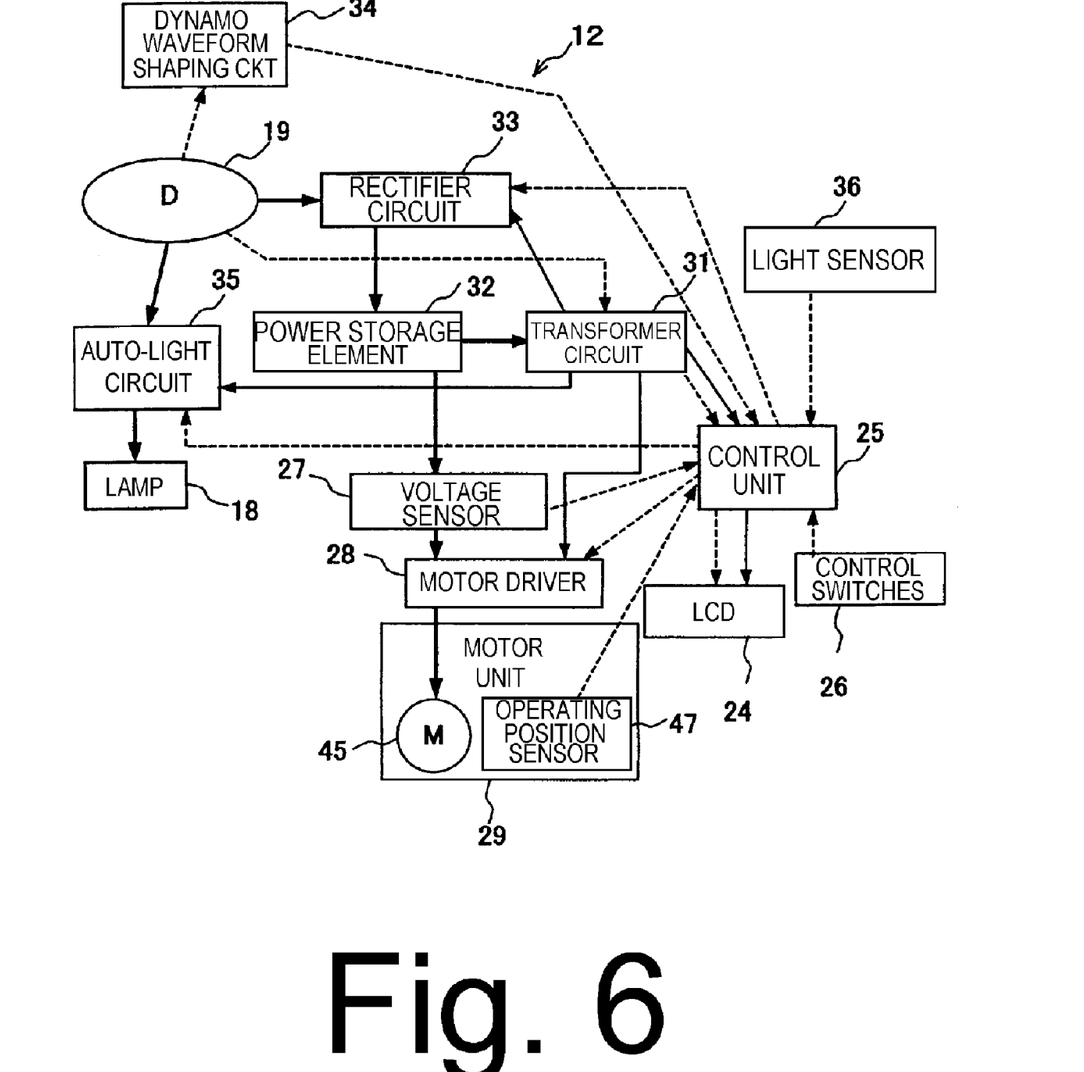
FIG. 6 is a schematic block diagram of the overall bicycle control system.

FIG. 6 is a block diagram illustrating the structure of the overall bicycle control system. Heavy lines in FIG. 6 indicate lines carrying about 1 A of current at approximately 6 V, solid lines indicate lines carrying about 5 mA of current at approximately 3.5 V, and dotted lines indicate signal lines. Control unit 25 is operatively coupled to control switches 26 (which schematically represents the operating dial 23 and operating buttons 21 and 22 in the shift controller 20); to the liquid crystal display device 24; to a dynamo waveform shaping circuit 34 that generates a speed signal derived from the output of alternating current generating dynamo 19; to a rectifier circuit 33; to a power supply in the form of a power storage element 32 (e.g., a capacitor, a battery unit, etc.); to a power supply sensor in the form of a voltage sensor 27 for sensing a power characteristic such as the voltage of power storage element 32; to a light sensor 36; to an auto light circuit 35 for controlling the lamp 18; to a motor driver 28; to the operating position sensor 47 of motor unit 29, and to a transformer circuit 31.

Transformer circuit 31 transforms the 6 V power stored in power storage element 32 into a control power supply of approximately 3.5 V. As shown in FIG. 6, transformer circuit 31 supplies this voltage to control unit 25, to motor driver 28, to rectifier circuit 33, and to auto-light circuit 35.

Motor driver 28 operates on the 5 mA current supplied by power storage element 32, and it controls a 1A current supplied by power storage element 32 to operate shifting motor 45.

Control unit 25 is a programmed unit that automatically controls shifting of internal shifting hub 10 via motor driver 28 according to travel speed. Control unit 25 also manually controls shifting of internal shifting hub 10 in response to signals from operating buttons 21 and 22. Control unit 25 also controls the operation of liquid crystal display device 24 disposed in shift controller 20. Control unit 25 controls lamp 18 by turning it on when surrounding light conditions fall below a certain prescribed brightness, and by turning it off when surrounding light conditions are above the prescribed brightness.

Rectifier circuit 33 comprises, for example, a half-wave rectifier circuit that rectifies an alternating current output from alternating current generating dynamo 19 to a current of 1A (for example) and supplies this current to power storage element 32. Power storage element 32 may comprise, for example, a high-capacity capacitor that stores the direct current power that is output from the charging rectifier circuit 33. Power storage element 32 also may comprise a secondary cell such as a nickel cadmium battery, a lithium ion battery, a nickel-metal hydride battery, etc., in lieu of a capacitor.

Battery replacement and recharging are unnecessary because power storage element 32 stores electrical power from alternating current generating dynamo 19, and components such as control unit 25 are operated using this electrical power. Monitoring remaining battery power and carrying along spare batteries also become unnecessary, and shifting can be done automatically without performing the cumbersome procedures required by conventional power sources.

Voltage sensor 27 is disposed between power storage element 32 and motor driver 28. Voltage sensor 27 senses the voltage of power storage element 32 and provides this information to control unit 25. If the voltage goes below a predetermined voltage Vs, control unit 25 commands motor driver 28 to operate motor unit 29 to shift internal shifting hub in a desired or predetermined manner. The predetermined voltage Vs is established with reference to a minimum operating voltage Vi below which motor 45 typically becomes inoperable. For example, when the minimum operating voltage Vi for motor 45 is approximately 4 V, then Vs is set to approximately 4.5 V to provide a margin of safety. In a preferred embodiment, the predetermined voltage Vs will be in a range of from approximately 2% to approximately 20% higher than the minimum operating voltage Vi.

Auto light circuit 35 supplies or interrupts the 1A current output from alternating current generating dynamo 19 to lamp 18 in response to on/off signal output from control unit 25. Control unit 25 generates these signal based on signals from light sensor 36 in such a manner that lamp 18 is switched on automatically when light levels fall below a prescribed limit, and it is switched off when light levels exceed the prescribed limit.

Dynamo waveform shaping circuit 34 forms a speed signal from the alternating current output from alternating current generating dynamo 19. More specifically, a half-cycle is extracted from a sine wave alternating current signal, passed through a Schmitt circuit or some other appropriate waveform shaping circuit, and formed into a pulse signal corresponding to speed. Control unit 25 uses this signal to control the automatic shifting of the internal shifting hub 10 without requiring a separate speed sensor. Control unit 25 also uses this signal to calculate speed and distance and to determine whether the bicycle is in a stopped condition for a predetermined time interval (e.g., 10 minutes).

Internal shifting hub 10 is controlled according to the detected bicycle speed and the selected shifting mode. Because alternating current generating dynamos generally have a plurality of circumferentially disposed magnetic poles, alternating current generating dynamo 19 outputs an alternating current signal with a frequency related to the bicycle speed and the number of magnetic poles. Consequently, it is possible to obtain a larger number of signal pulses from the alternating current signal during each wheel rotation in comparison with a speed signal obtainable, for example, from a conventional speed sensor that detects a magnet mounted to the bicycle wheel. Therefore, the bicycle speed can be accurately detected within the space of one wheel rotation, and shifting can be controlled in real time with high precision. Furthermore, since shifting is controlled based on the alternating current signal from alternating current generating dynamo 19, it is no longer necessary to dispose shift control unit 12 in the vicinity of the bicycle wheel. No limitation is placed on the mounting position of shift control unit 12.

In the case of automatic shift mode, control is performed by means of upshift threshold values and downshift threshold values as shown in FIG. 7. For example, in automatic shift mode (A1), when bicycle velocity reaches 13 km/h, the system upshifts from first gear to second gear. When bicycle velocity reaches 16 km/h, the system upshifts to third gear, and when bicycle velocity reaches 19 km/h, the system upshifts to fourth gear. When bicycle velocity subsequently slows to 17 km/h, the system downshifts from fourth gear to third gear. When bicycle velocity slows to 14 km/h, the system downshifts to second gear, and when bicycle velocity falls to 12 km/h the system downshifts to first gear. In this embodiment, in order to prevent chattering during shifting, the shift timing for upshifting and the shift timing for downshifting are lowered toward the downshift end.

Figure 8:
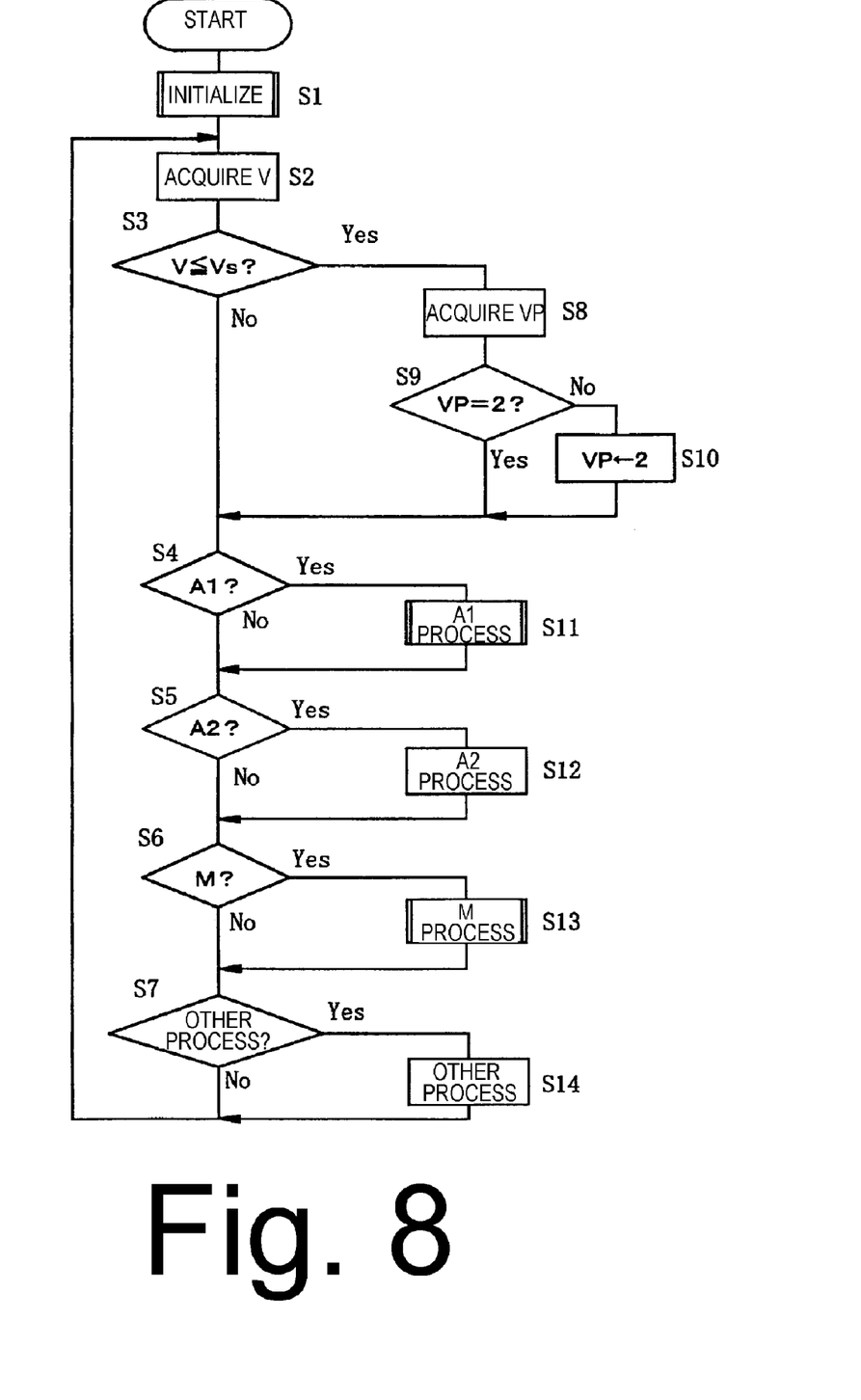
FIG. 8 is flow chart of a particular embodiment of a main routine for the shift control unit.
Figure 9:
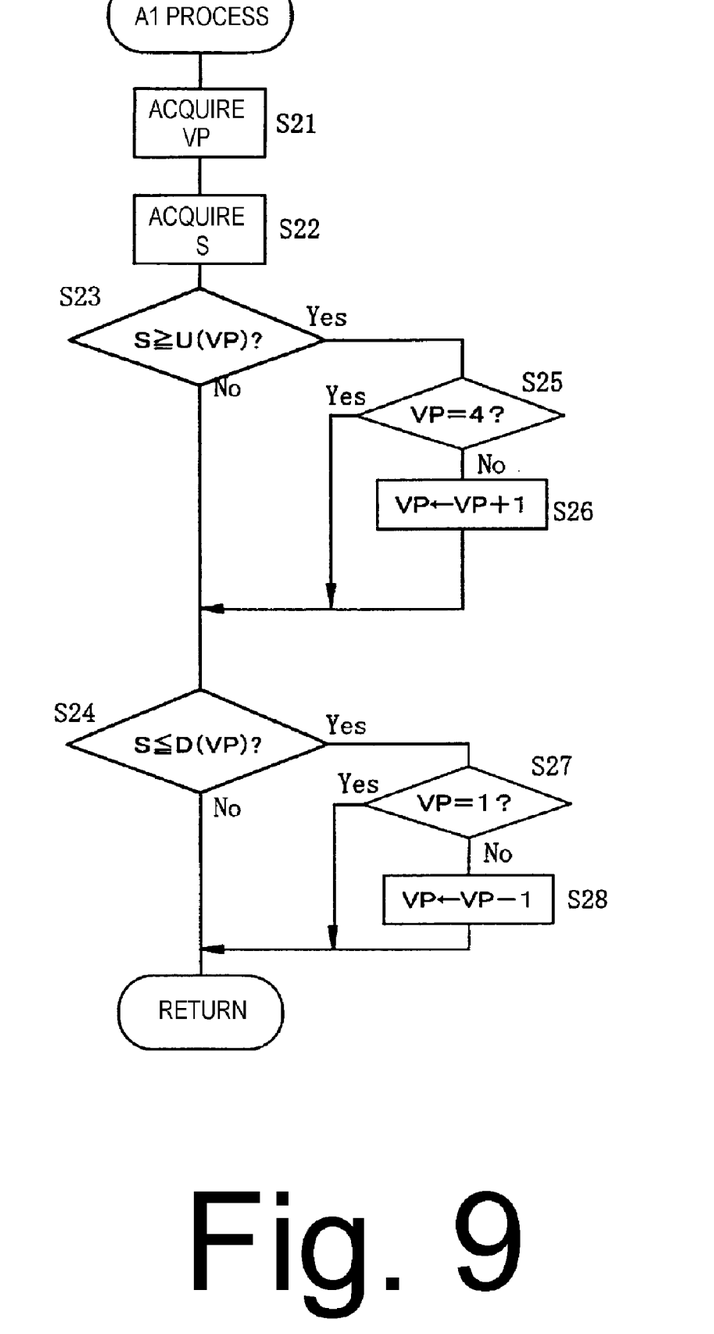
FIG. 9 is a flow chart of a particular embodiment of an automatic shift process.
Figure 10:
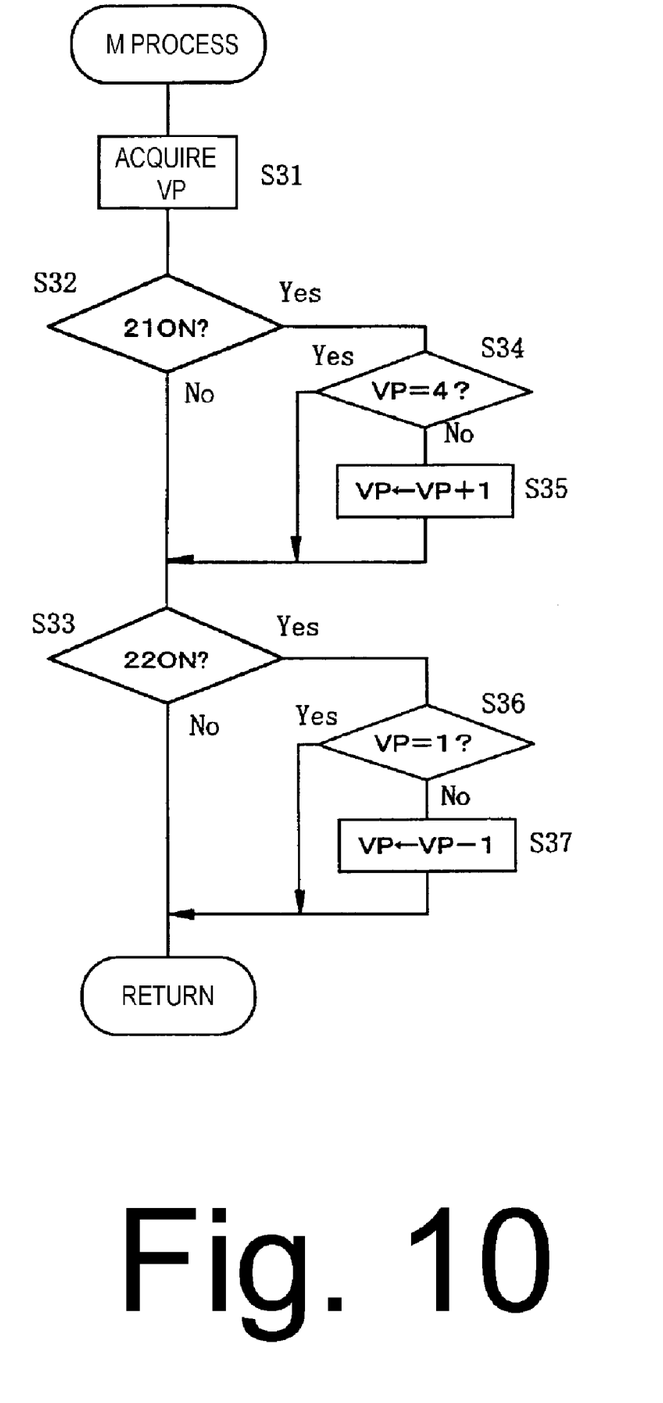
FIG. 10 is a flow chart illustrating a particular embodiment of a manual shift process.

The operation of control unit 25, may be understood from the flowcharts shown in FIGS. 8–10. When the bicycle begins running, power storage element 32 is charged from the signals received from alternating current generating dynamo 19 through rectifier circuit 33. When the voltage of power storage element 32 reaches a predetermined level, control unit 25 begins operation and performs an initialization operation in a Step S1 as shown in FIG. 8. For example, internal shifting hub 10 may be set to second gear (VP=2), wheel circumference may be set to 26 inches to facilitate the calculation of bicycle velocity, and various flags and timers may be initialized.

In Step S2, a voltage V sensed by voltage sensor 27 is acquired. It is then determined in a Step S3 whether or not the acquired voltage V is less than or equal to the predetermined voltage Vs. If not, then processing moves to Step S4. However, if the voltage V is less than or equal to the predetermined voltage Vs, then the current gear position VP is acquired from operating position sensor 47 in a Step S8. It is then determined in a Step S9 whether or not the current gear position is second gear (VP =2). If so, then processing simply moves to Step S4. Otherwise, the value of the gear position VP is set to 2 so that control unit 25 provides a signal to shift internal shifting hub 10 to second gear. In other words, internal shifting hub 10 is shifted to second gear, regardless of the current bicycle velocity. As a result, even if the voltage of power storage element 32 subsequently drops to the point that shift motor 45 no longer operates, discomfort for the rider will not result.

In any event, it is then determined in Step S4 whether or not control dial 23 is set to automatic shifting mode (A1). If so, then an automatic shifting (A1) process described below is performed in a Step S11. In any event, it is then determined in a Step S5 whether or not control dial 23 is set to automatic shifting mode (A2). If so, then an automatic shifting (A2) process similar to automatic shifting (A1) process is performed in a Step S12. In any event, it is then determined in a Step S6 whether or not control dial 23 is set to manual shifting mode (M). If so, then a manual shifting (M) process described below is performed in a Step S13. In any event, it is then determined in a Step S7 whether or not another process has been selected. If so, then the other process is performed in a Step S14. Processing then returns to Step S2.

In general, in the automatic shifting (A1) process of Step S11 (and the automatic shifting (A2) process of Step S12), the operating position VP of internal shifting hub 10 is set to a proper gear ratio depending on the bicycle speed S and the upshift and downshift threshold values indicated in FIG. 7. If the bicycle speed S passes the upshift or downshift threshold value for the current gear, then shifting is performed in one speed increments to set internal shifting hub 10 in the proper gear ratio.

FIG. 9 is a flow chart of a particular embodiment of automatic shifting (A1) process of Step S11. The automatic shifting (A2) process of Step S12 differs from the automatic shifting (A1) process only by shift threshold values, so a separate description of automatic shifting (A2) process will not be provided. As shown in FIG. 9, the operating position VP of operating position sensor 47 is acquired in a Step S21, and then current speed S of the bicycle is acquired in a Step S22 by means of the speed signal derived from alternating current generating dynamo 19. It is then determined in a Step S23 whether or not the acquired current bicycle speed S exceeds the upshift threshold value U(VP) shown in FIG. 7 corresponding to the operating position VP of operating position sensor 47. For example, when internal shifting hub 10 is in second gear (VP=2), the decision will be "Yes" if speed S is faster than 16 km/h. If so, it is then determined in a step S25 whether or not the internal shifting hub 10 currently is in fourth gear. If not, then the operating position VP is incremented by one in a Step S26, and control unit 25 outputs a signal for upshifting internal shifting hub 10 by one gear.

If it is determined in Step S25 that internal shifting hub 10 currently is in fourth gear, then no further upshifting is possible. Of course, since the upshift threshold value for fourth gear is 255, which would be inconceivable with normal shifting, it is not normal to pass through this step. In any event, no further action is taken to upshift internal shifting hub 10 in either case, and processing moves to Step S24.

In Step S24, it is determined whether or not the acquired current speed S is below the downshift threshold value D(VP) shown in FIG. 7 corresponding to the operating position VP of operating position sensor 47. For example, when internal shifting hub 10 currently is in second gear (VP=2), the decision will be "Yes" if speed S is slower than 12 km/h. If not, then the process returns to the main routine. If so, it is then determined in a Step S27 whether or not internal shifting hub 10 currently is in first gear. If so, then no further downshifting is possible, so the process returns to the main routine. Otherwise, the operating position VP is decremented by one, control unit 25 outputs a signal to downshift internal shifting hub 10 by one gear, and the process returns to the main routine.

FIG. 10 is a flow chart illustrating a particular embodiment of the manual shifting (M) process of Step S6 in FIG. 8. As shown in FIG. 10, the operating position VP of operating position sensor 47 is acquired in a Step S31. It is then determined in a Step S32 whether or not operating button 21 is being pressed. If so, it is then determined in a Step S34 whether or not internal shifting hub 10 currently is in fourth gear. If not, then the operating position VP is incremented by one in a Step S35, and control unit 25 outputs a signal for upshifting internal shifting hub 10 accordingly. On the other hand, if it is determined in Step S34 that internal shifting hub 10 currently is in fourth gear, then no further upshifting is possible. Accordingly, no further action is taken to upshift internal shifting hub 10 at this time, and processing moves to Step S33.

In any event, it is then determined in a Step S33 whether or not operating button 22 is being pressed. If so, it is then determined in a Step S36 whether or not internal shifting hub 10 currently is in first gear. If not, then the operating position VP is decremented by one in a Step S37, and control unit 25 outputs a signal to downshift internal shifting hub 10 accordingly. On the other hand, if it is determined in Step S36 that internal shifting hub 10 currently is in first gear, then no further downshifting is possible. Accordingly, no further action is taken to downshift internal shifting hub 10 at this time, and processing returns to the main routine.

While the above is a description of various embodiments of the present invention, further modifications may be employed without departing from the spirit and scope of the present invention. For example, while the disclosed embodiment used an internal shifting hub as the bicycle transmission, the teachings herein also may be applied to the control of an external bicycle transmission having a plurality of sprockets and a derailleur. In that case, since shifting of a derailleur is not possible unless the crank is turning, if voltage should drop to an undesirable level while the bicycle is stopped, then actual shifting will take place once riding has commenced.

While a shift motor was used in the described embodiment to operate the bicycle transmission, the transmission also could be operated by some other mechanism, such as a solenoid. Placement of the motor unit 29 (including the shift motor) and the control unit 25 is not restricted, and these components could be placed in many locations. For example, motor unit 29 could be disposed at internal shifting hub 10 or other transmission to drive the transmission directly. If desired, control unit 25 could be disposed with shift controller 20.

Figure 11:
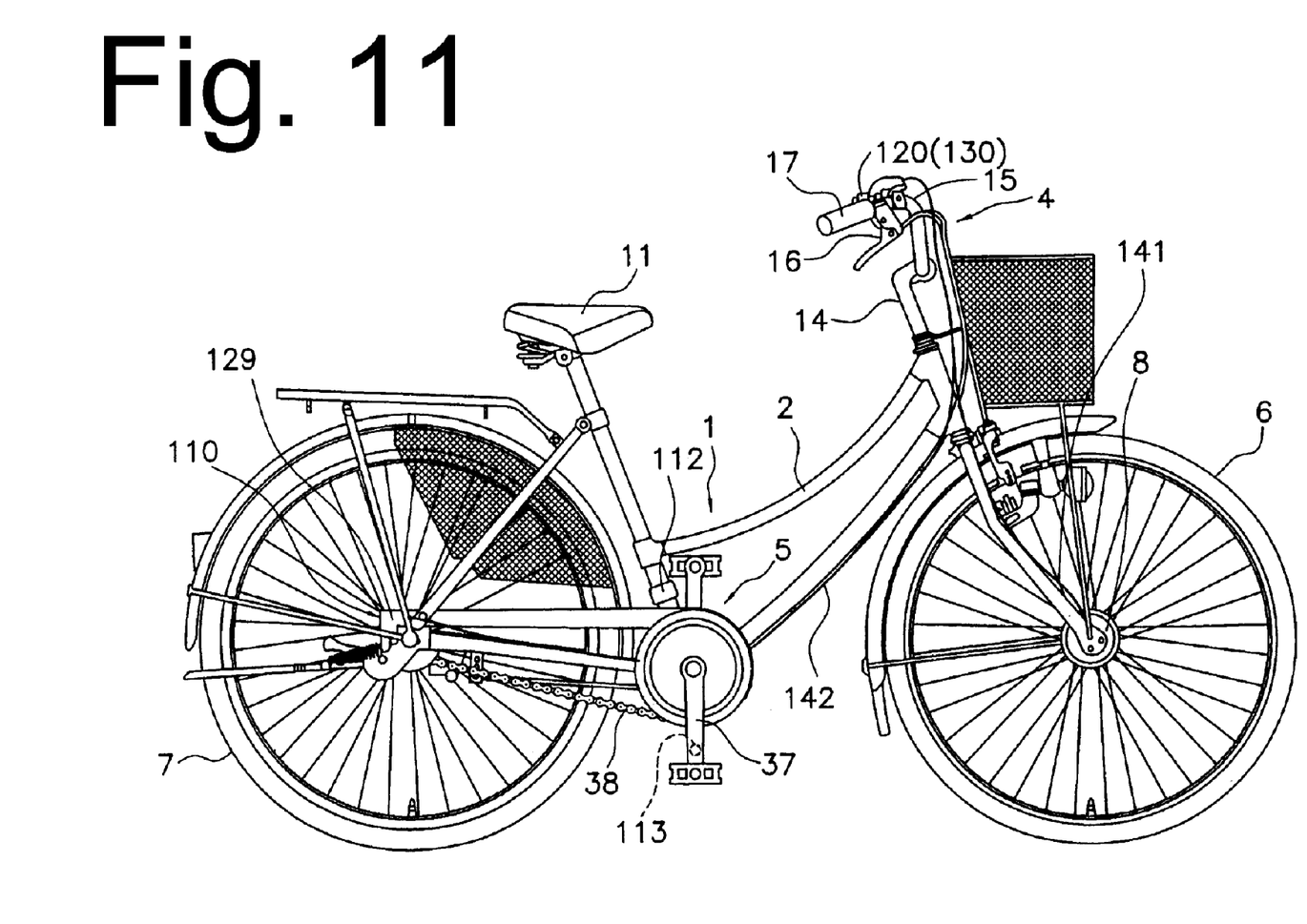
FIG. 11 is a side view of another embodiment of a bicycle.
Figure 12:
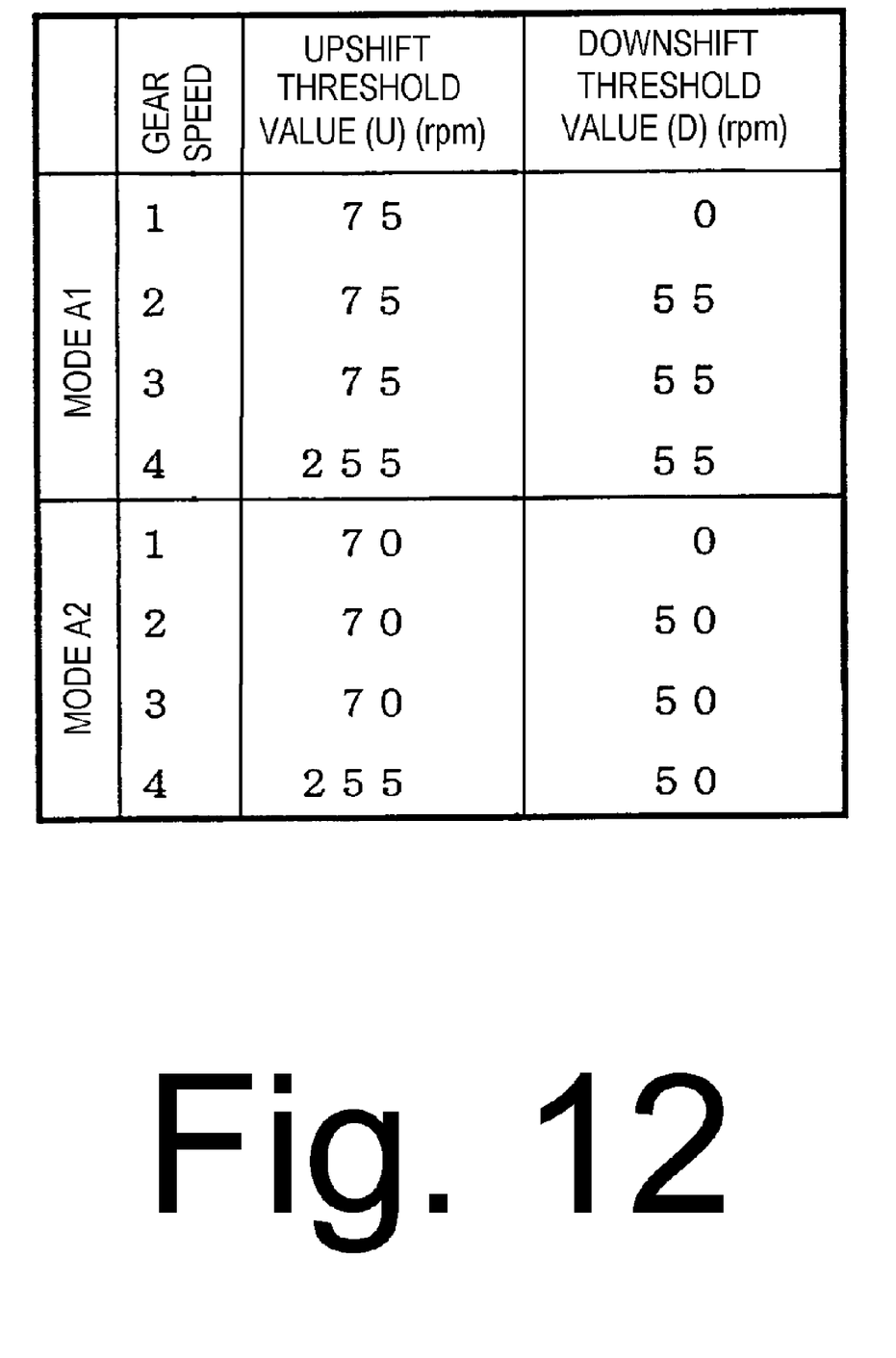
FIG. 12 is a table illustrating a particular embodiment of shift threshold values for the embodiment shown in FIG. 10.

While velocity was used as the riding condition in the described embodiment, crank rotation speed could be used instead. FIG. 11 is a side view of a bicycle that is equipped for that purpose. As shown in FIG. 11, a signal provider 113 such as a magnet may be installed on gear crank 37, and a rotation sensor 112 such as a reed switch may be installed on frame body 2 to sense crank rotation speed. In this case, an upper limit and a lower limit for crank rotation speed for each gear position could be set as shift threshold values as shown in FIG. 12. In this embodiment, the same values are set for each gear position, but different shift threshold values could be provided instead. In automatic shifting mode, analogous to the operation shown in FIG. 9, upshifting is performed when the current crank rotation speed S exceeds the upshift threshold value, and downshifting is performed when the current crank rotation speed S falls below the downshift threshold value.

In the embodiment shown in FIG. 11, motor unit 29 and circuit unit 30 are not arranged in lamp case 13. Instead, a motor unit 129 is disposed at an internal shifting hub 110, with internal shifting hub 110 being actuated directly. A circuit unit 130 like that shown in FIG. 5 including a control unit 25 is disposed inside a shift controller 120. Power from an alternating current generating dynamo 19 inside dynamo hub 8 is supplied to circuit unit 130 via electrical wiring 141, and the power from alternating current generating dynamo 19 charges power storage element 32. Shift controller 120 and internal shifting hub 110 are connected by electrical wiring 142 instead of by a shift cable, a shift signal is output by control unit 25 to motor unit 129, and an operating position signal is output by an operating position sensor to control unit 25 inside shift controller 120 by means of electrical wiring 142. Alternatively, control unit 25 could be disposed inside internal shifting hub 110, and control unit 25 and shift controller 120 could be connected by electrical wiring.

While the bicycle transmission was set to second gear when the voltage of power storage element 32 dropped to an undesirable level, the transmission could be shifted to some other gear, such as third gear. When more gear ratios are provided, the predetermined gear ratio could be any intermediate gear ratio, preferably but not necessarily excepting the highest gear and the lowest gear. In any event, it is particularly advantageous for the chosen predetermined gear ratio to be close to the ratio of crank rotation speed to rear wheel rotation speed in an ordinary bicycle, such as a ratio in the range of from approximately 1.2 to approximately 1.5.

Figure 13:
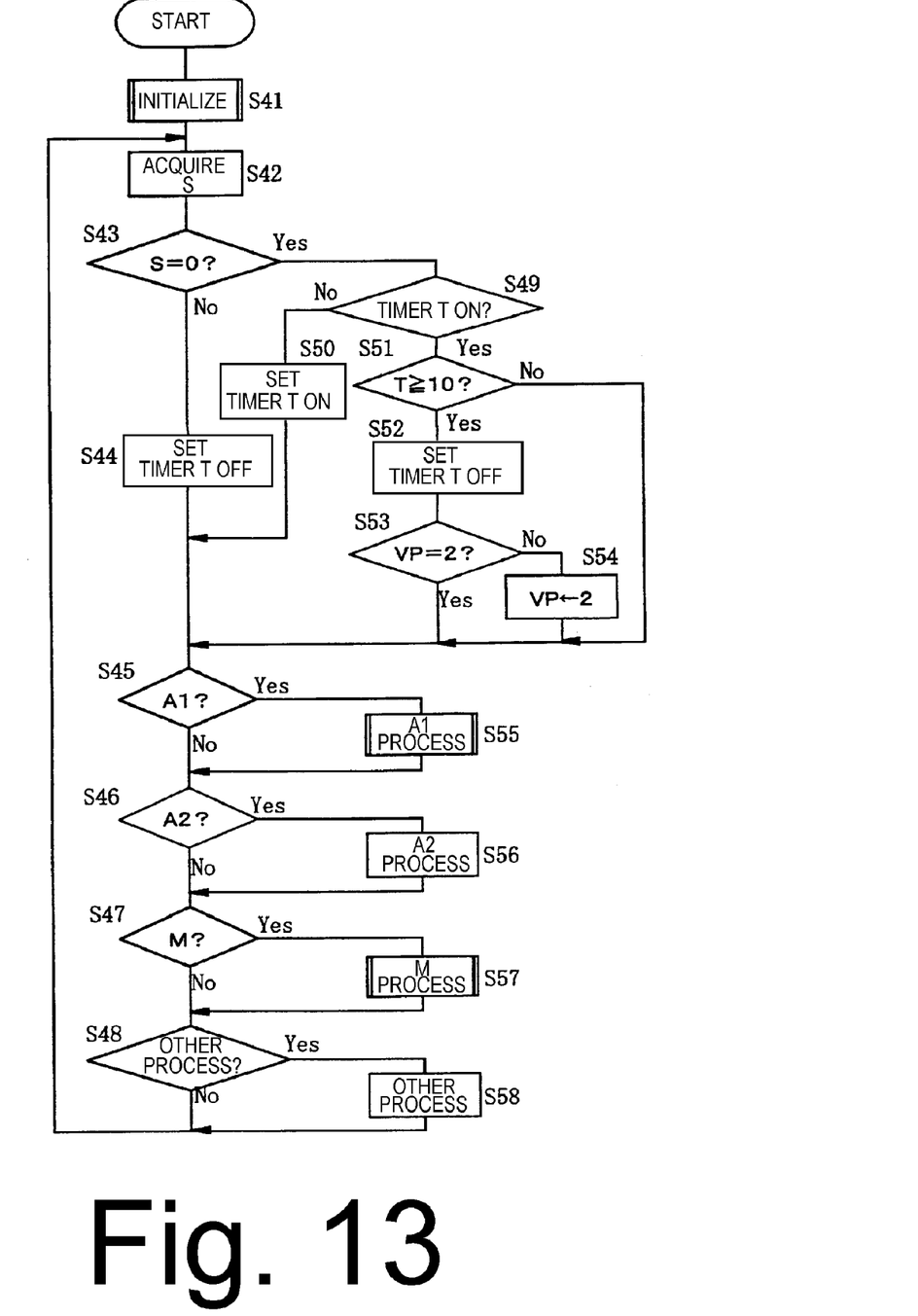
FIG. 13 is flow chart of another embodiment of a main routine for the shift control unit.

In the described embodiment, shifting to a predetermined gear ratio is carried out if voltage of the power storage element 32 drops to an undesirable level. However, a running condition time sensor could be provided so that shifting to a predetermined gear ratio is carried out whenever a running condition of the bicycle creates a risk that power storage element 32 could discharge to an undesirable level. FIG. 13 is a flow chart illustrating processing for an embodiment that includes such a running condition time sensor such as a stop time sensor. After initialization in a step S41, current velocity S is acquired in a Step S42. It is then determined in a Step S43 whether or not current velocity S equals 0 (i.e., the bicycle is stopped). If the bicycle is not stopped, processing moves to Step S44, and a stop time sensor such as a timer T for measuring stop time is turned off. This ensures that timer T will be turned off during a brief stop. Step S45 through Step S48 and Step S55 through Step S58 in FIG. 13 are the same as Step S4 through Step S7 and Step S11 through Step S14 in FIG. 8, respectively, and need not be described.

If it is determined in Step S43 that the bicycle is stopped, then it is determined in a Step S49 whether or not timer T already has been turned on (started). If not, then timer T is turned on in a Step S50, and processing moves to Step S45. However, if timer T already has been turned on, it is then determined in a Step S51 whether or not 10 or more minutes have elapsed since timer T was turned on (i.e. whether the bicycle has been stopped for 10 or more minutes). If the bicycle has not been stopped for 10 or more minutes, then processing moves to Step S45. On the other hand, if the bicycle has been stopped for 10 or more minutes, then timer T is turned off in a Step S52, and it is determined in a Step S53 whether or not the current gear VP is second gear (VP=2). If so, then processing moves to Step S45 without performing any shift process. However, if the current gear VP is not second gear, then VP is set to 2 in a Step S54, and control unit 25 outputs a signal to shift internal shifting hub 10 to second gear. As a result, motor unit 29 operates to shift internal shifting hub 10 to second gear, regardless of the current gear.

Of course, the method for measuring stop time is not limited to that described here, nor is stop time limited to 10 minutes. Any measuring device may be used, and any time interval that allows a distinction to be made from a temporary stop during riding, such as waiting for a stoplight, would be acceptable. In a preferred embodiment, the stop interval is preferably but not necessarily at least five minutes. In this embodiment, since the bicycle is shifted to a desired or predetermined gear whenever there is a risk that voltage will drop to an undesirable level based on time (due to parking for an extended period, for example) a subsequent drop in voltage to the point that the bicycle transmission can no longer operate will not create discomfort for the rider. Additionally, since there is no need to sense voltage in such an embodiment, and since the predetermined time interval can be determined using a timer function provided by the microcomputer in control unit 25, the design of the control device can be simplified.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A control apparatus for an electrically operated bicycle transmission that has a plurality of gear ratios and that operates using power from a power supply, wherein the apparatus comprises:
    a power supply sensor that senses a power characteristic of the power supply; and
    a control unit operatively coupled to the power supply sensor, wherein the control unit provides a signal to operate the bicycle transmission to move when the power characteristic falls below a predetermined value.

2. The apparatus according to claim 1 wherein the power characteristic comprises a voltage of the power supply.

3. The apparatus according to claim 2 wherein the predetermined value is in the range of from approximately 2% to approximately 20% of a minimum operating voltage of the bicycle transmission.

4. The apparatus according to claim 1 wherein the power supply sensor is structured to sense the power characteristic of a power storage element.

5. The apparatus according to claim 4 wherein the power supply sensor is structured to sense the power characteristic of a power storage element that is charged by an alternating current generator.

6. The apparatus according to claim 4 wherein the power storage element comprises a capacitor.

7. The apparatus according to claim 4 wherein the power storage element comprises a battery.

8. The apparatus according to claim 1 wherein the signal to operate the bicycle transmission comprises a signal to operate an internal shifting hub.

9. The apparatus according to claim 1 wherein the signal to operate the bicycle transmission comprises a signal to operate a derailleur.

10. The apparatus according to claim 1 wherein the signal to operate the bicycle transmission comprises a signal to set the bicycle transmission to a predetermined gear ratio.

* * * * *